US008306556B2

(12) United States Patent
Chao et al.

(10) Patent No.: US 8,306,556 B2
(45) Date of Patent: Nov. 6, 2012

(54) INTELLIGENT REAL-TIME DISTRIBUTED TRAFFIC SAMPLING AND NAVIGATION SYSTEM

(75) Inventors: Yi-Chung Chao, Fremont, CA (US); Robert Rennard, Gilroy, CA (US); HaiPing Jin, San Jose, CA (US); Salman Dhanani, Redmond, WA (US)

(73) Assignee: Telenav, Inc., Santa Clara, CA (US)

(*) Notice: Subject to any disclaimer, the term of this patent is extended or adjusted under 35 U.S.C. 154(b) by 1094 days.

(21) Appl. No.: 11/349,749

(22) Filed: Feb. 8, 2006

(65) Prior Publication Data

US 2007/0185645 A1 Aug. 9, 2007

(51) Int. Cl.
*H04W 24/00* (2009.01)

(52) U.S. Cl. .................. 455/457; 455/456.1; 455/456.2; 455/456.5

(58) Field of Classification Search ............... 455/404.2, 455/456.1–457; 340/539.13
See application file for complete search history.

(56) References Cited

U.S. PATENT DOCUMENTS

| | | | | |
|---|---|---|---|---|
| 4,167,785 | A | 9/1979 | McReynolds et al. | |
| 5,812,069 | A * | 9/1998 | Albrecht et al. | 340/905 |
| 6,061,625 | A * | 5/2000 | Fastenrath | 701/117 |
| 6,405,123 | B1 | 6/2002 | Rennard et al. | |
| 6,587,777 | B1 * | 7/2003 | St. Pierre | 701/117 |
| 6,597,906 | B1 * | 7/2003 | Van Leeuwen et al. | 455/422.1 |
| 6,810,321 | B1 * | 10/2004 | Cook | 701/117 |
| 6,959,436 | B2 | 10/2005 | Peng | |
| 6,963,799 | B2 | 11/2005 | Kita et al. | |
| 6,965,325 | B2 | 11/2005 | Finnern | |
| 2005/0216147 | A1 | 9/2005 | Ferman | |
| 2005/0222760 | A1 * | 10/2005 | Cabral et al. | 701/209 |
| 2010/0010739 | A1 | 1/2010 | Tsushima | |

FOREIGN PATENT DOCUMENTS

| | | | |
|---|---|---|---|
| DE | 10133387 | | 1/2003 |
| EP | 0715286 | | 6/1996 |
| EP | 0880120 | | 11/1998 |
| EP | 1577643 | A1 * | 9/2005 |
| WO | WO02/060157 | A2 * | 8/2002 |

OTHER PUBLICATIONS

Office Action for European patent application No. 07763527.4.

* cited by examiner

*Primary Examiner* — Patrick Edouard
*Assistant Examiner* — Ronald Eisner
(74) *Attorney, Agent, or Firm* — Ishimaru & Associates LLP; Mikio Ishimaru; Stanley M. Chang

(57) ABSTRACT

A method of operation of an intelligent real-time distributed traffic sampling and navigation system includes: receiving navigation information of a client; analyzing the navigation information to provide traffic information; generating a travel route based on the analyzing the navigation information; and sending the travel route for display on the client.

18 Claims, 4 Drawing Sheets

INTELLIGENT REAL-TIME DISTRIBUTED TRAFFIC SAMPLING AND NAVIGATION SYSTEM

FIELD OF INVENTION

The present invention relates generally to location based services systems and traffic sampling systems, and more particularly, to a system for a distributed traffic sampling and navigation system wherein a client and a server communicate to carry out traffic sampling and navigation tasks.

DESCRIPTION OF RELATED ART

Rapid growth in consumer electronics is evident with mobility as a ubiquitous feature. Consumer electronics products, such as music players, digital cameras, personal digital assistants (PDA), cellular phones, and notebooks, offer means for users to create, transfer, store, and consume information almost anywhere, anytime.

One consumer electronics growth, where mobility is quintessential, is in location based services, such as navigation systems utilizing satellite-based Global Positioning System (GPS) devices. Location based services allow users to create, transfer, store, and/or consume information in the "real world". One such use of location based services is to efficiently transfer or route users to the desired destination or service.

Navigation systems have been incorporated in automobiles, notebooks, handheld devices, and other portable products. Today, these systems aide users by providing start to destination routes incorporating existing sampled roadway data with traffic conditions. However, sampled roadway data are not always real-time or available for all roadways.

Several technical obstacles prevent these navigation systems to efficiently transfer "real-time" data. One such obstacle is the amount of geographic data needed to provide reasonably detailed navigational information. Stationary monitoring sites provide some traffic information but are expensive to install and are not necessarily available for all roadways. Consequently, it is desirable to develop a navigation system that provides cost-effectiveness and improved accuracy and effectiveness to reflect "real-time" conditions in providing navigation data to users.

SUMMARY OF THE INVENTION

The present invention provides a method of operation of an intelligent real-time distributed traffic sampling and navigation system including: receiving navigation information of a client; analyzing the navigation information to provide traffic information; generating a travel route based on the analyzing the navigation information, and sending the travel route for display on the client.

The intelligent real-time distributed traffic sampling and navigation system provides flexible, geographically expansive, and robust real-time navigation information to location based services enabled devices that have not been previously achieved. The geographically distributed client devices provide traffic sampling capability not constrained by existing traffic monitoring infrastructures and systems. The system intelligently provides server-client partition to control sampling, storing, transmitting, receiving, and processing the sampled navigation information. The system intelligently optimizes the server interaction with the client, as well as the client interaction with the server, such as to control sampled data sent from the distribution of clients to the server for deriving traffic information. The system may monitor and control sampling rates and the number of samples for a geographic region of interest. Consequently, the intelligent real-time distributed traffic sampling and navigation system provides an efficient system to generate and validate travel routes, estimated travel time, and update location based services at the location of the distributed client devices.

BRIEF DESCRIPTION OF THE DRAWINGS

The accompanying drawings that are incorporated in and form a part of this specification illustrate embodiments of the invention and together with the description, serve to explain the principles of the invention.

DETAILED DESCRIPTION

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments not necessarily enumerated herein. Thus, the present invention is not intended to be limited to the embodiments shown but is to be accorded the widest scope consistent with the principles and features described herein.

A key component of a navigation system is the determination of the navigation information, or the position, of a user. It is intended that the term navigation information referred to herein comprises a geographic location, or a geographic information, relating to the position of an object. The navigation information may contain three-dimensional information that completely or substantially defines the exact position of an object. In some embodiments, the navigation information may provide partial position information to define the position of an object. Broadly defined, as used herein, navigation information also may include speed, time, direction of movement, etc. of an object.

One skilled in the art would appreciate that the format with which a navigation information is expressed is not critical to some embodiments of the invention. For example, in some embodiments, navigation information is presented in the format of (x, y), where x and y are two ordinates that define the geographic location, i.e., a position of a user. In an alternative embodiment, navigation information is presented by longitude and latitude related information. In another embodiment of the present invention, the navigation information also includes a velocity element comprising a speed component and a heading component.

Figure 1:
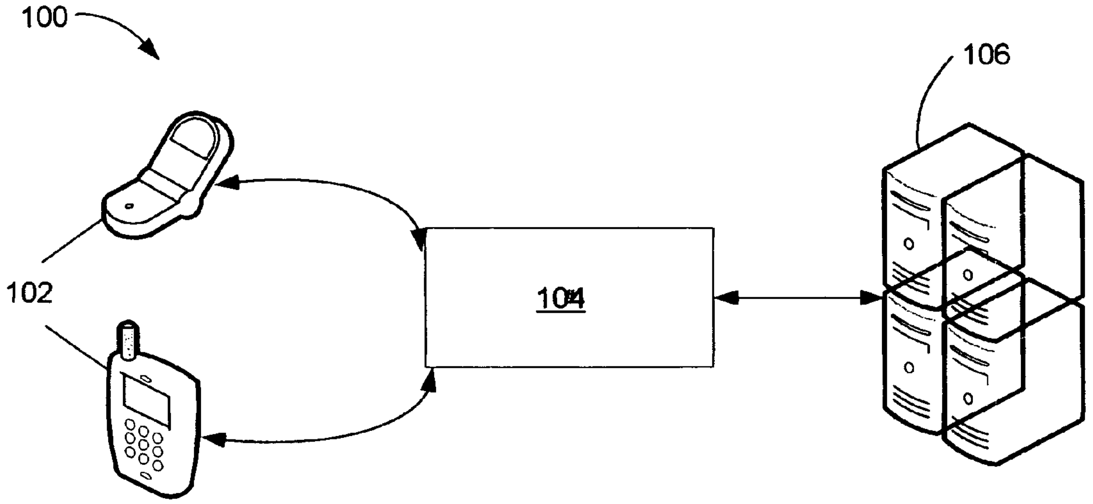
FIG. 1 is an architectural diagram of an intelligent real-time distributed traffic sampling and navigation system in an embodiment of the present invention.

Referring now to FIG. 1, therein is shown an architectural diagram of an intelligent real-time distributed traffic sampling and navigation system 100 in an embodiment of the present invention. The architectural diagram depicts a client 102, such as location based service (LBS) enabled communication device, a communication path 104, and a server 106. The client 102 may be any number of locations based service communication device, such as a smart phone, cellular phone, satellite phone, or integrated into vehicular telematic.

The processing intelligence of the intelligent real-time distributed traffic sampling and navigation system 100 is partitioned between the server 106 and the client 102, with both having sampling rules and logic to intelligently perform the respective functions. The server 106 may control and intelligently optimize the interaction, such as changing traffic sampling rate, sampling events (periodic or aperiodic), or selecting the geographic region to sample by client 102. The server 106 may also receive and analyze the sampled real-time navigation information from the client 102. For example, the server 106 may change the sampling rules on the client 102, or change the parameters of the sampling rules based on information received from different sources, such as other moving objects, weather, event information proximate to the client 102, or other relevant information. The server 106 may set logic for the interaction between the client 102 and the server 106, such as to obtain or set new parameters for the local sampling rules for location sampling. The client 102 may interact with the server 106 utilizing the communication path 104. The client 102 may have functions included or may be included at different times to conduct traffic sampling under different rules or conditions, such as traveling speed compared with nominal speed, speed limit or speed of the distribution of the client 102 proximate to the client 102. For illustrative purposes, the server 106 is shown as multiple units in a single location, although it is understood that the number of units of the server 106 and the locations of the server 106 may be distributed, as well.

Similarly, a distribution of the client 102 provides real-time traffic information from the sampled navigation information. The server 106 or the distribution of the server 106 may control and intelligently optimize the interaction with the distribution of the client 102. For illustrative purposes, the server 106 or the distribution of the server 106 may interact with the client 102 or a distribution of the client 102. However, it is understood that a portion of the distribution of the server 106 and the distribution of the client 102 may interact, as well. Also for illustrative purposes, the distribution of the server 106 and the distribution of the client 102 are shown to interact, although it is understood that a different or intersecting set of distribution of the server 106 and the client 102 may also interact, as well.

The server 106, the client 102, or the combination thereof, may select a region, such as a particular geographic region, a roadway, or a region surrounding the client 102, to sample and analyze real-time navigation information collected by the client 102. The server 106, the client 102, or the combination thereof, may control the intelligent real-time distributed traffic sampling and navigation system 100 by increasing the sampling rate from the distribution of the client 102 improving traffic information accuracy. This is useful, such as when the number of the navigation information samples from the distribution of the client 102 is sparse, to reconcile outlier samples from the distribution of the client 102, or to extrapolate traffic information in a no service area. The server 106, or the client 102, or the combination thereof may decrease the sampling rate from the distribution of the client 102 to optimize the interaction to the server 106 and the workload for the server 106. This maximizes efficiency of the server 106, such as when traffic information has been constant and substantially predictable. The server 106 may intelligently select a portion of the distribution of the client 102 to optimize the interaction and the workload for the server 106, such as during heavy traffic volume. Under certain conditions, the client 102 may proactively interact with the server 106 providing information, such as navigation information, to the server 106. The server 106 use the provided information for improving the logic and rules for information gathering by the client 102. For example, the speed information from the client 102 may suddenly change from a high non-zero value to zero, and remain at zero for a time. In this case, there might be a strong likelihood of a car accident, and the client 102 may autonomously increase the sampling rate and interact with the server 106 providing more frequent updates to the server 106. The client 102 can also store and forward the sampled navigation information, based on rules within the client 102, such as to accommodate when the client 102 operates within a no server access region.

For illustrative purposes, the server 106, the client 102, or the combination thereof is described as intelligently increasing or decreasing sampling rate or number of samples, although it is understood that the server 106, the client 102, or the combination thereof may provide other forms of controls and interactions to the distribution of the client 102, as well. Also for illustrative purposes, the interaction of the server 106 is described as between the server 106 and the distribution of the client 102, although it is understood the interaction may be to other elements of the intelligent real-time distributed traffic sampling and navigation system 100, such as to another of the server 106 in a distribution of the server 106.

The client 102, having location based service capability, interacts with a navigation system, such as a Global Positioning System, of the communication path 104 for navigation information. The location based service may also include other information to assist the user of the client 102, such as local businesses and locations, traffic conditions, or other points of interest, which may adjust the travel route provided by the navigation system.

The client 102 comprises a control device (not shown), such as a microprocessor, software (not shown), memory (not shown), cellular components (not shown), navigation components (not shown), and a user interface. The user interface, such as a display, a key pad, and a microphone, and a speaker, allows the user to interact with the client 102. The microprocessor executes the software and provides the intelligence of the client 102 for the user interface, interaction to the cellular system of the communication path 104, and interaction to the navigation system of the communication path 104, as well as other functions pertinent to a location based service communication device, and communicating with the server 106.

The memory, such as volatile or nonvolatile memory or both, may store the software, setup data, and other data for the operation of the client 102 as a location based service communication device. For illustrative purpose, the functions of the client 102 may be performed by any one in the list of software, firmware, hardware, or any combination thereof The cellular components are active and passive components, such as microelectronics or an antenna, for interaction to the cellular system of the communication path 104. The navigation components are the active and passive components, such as microelectronics or an antenna, for interaction to the navigation system of the communication path 104.

Figure 2:
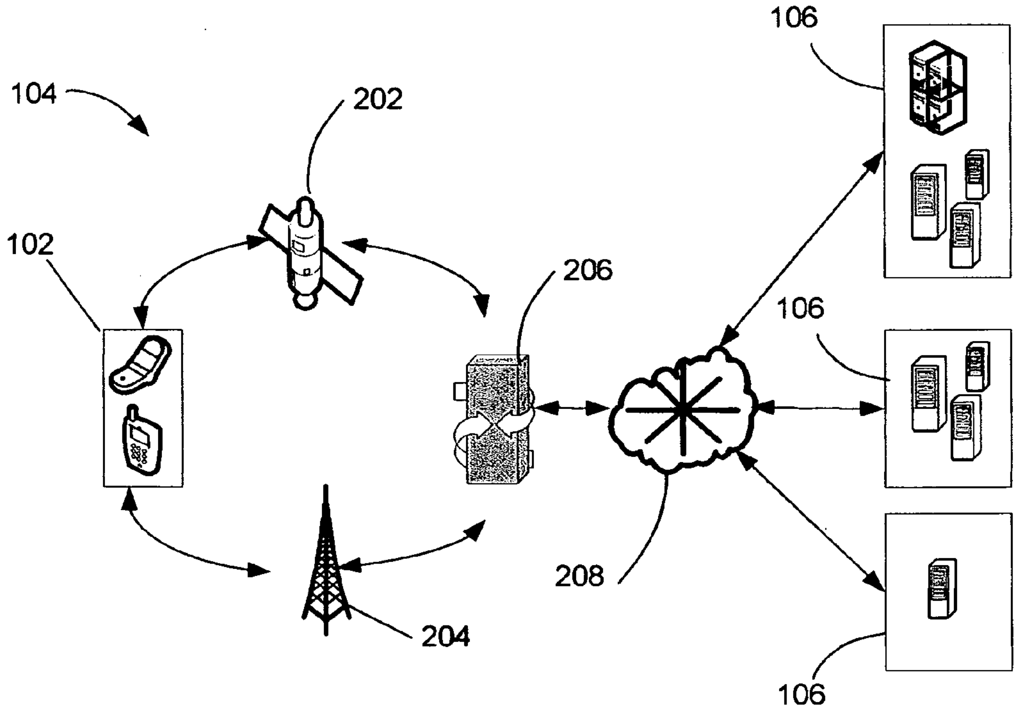
FIG. 2 is a more detailed architectural diagram of the communication path of FIG. 1.

Referring now to FIG. 2, therein is shown a more detailed architectural diagram of the communication path 104 of FIG. 1. The communication path 104 includes a satellite 202, a cellular tower 204, a gateway 206, and a network 208. The satellite 202 may provide the interaction path for a satellite phone form of the client 102, or may be part of the navigation system, such as Global Positioning System, to provide the interaction path for the client 102 with location based service capability. The satellite 202 and the cellular tower 204 provide an interaction path between the client 102 and the gateway 206. The gateway 206 provides a portal to the network 208 and subsequently the distribution of the server 106. The network 208 may be wired or wireless and may include a local area communication path (LAN), a metropolitan area communication path (MAN), a wide area communication path (WAN), a storage area communication path (SAN), and other topological forms of the network 208, as required. The network 208 is depicted as a cloud of cooperating network topologies and technologies.

For illustrative purposes, the satellite 202 is shown as singular, although it is understood that the number of the satellite 202 may be more than one, such as a constellation of the satellite 202 to form navigation system interaction path, as well. Also for illustrative purposes, the cellular tower 204 is shown as singular, although it is understood that the number of the cellular tower 204 may be more than one, as well. Further for illustrative purposes, the gateway 206 is shown as singular, although it is understood that the number of the gateway 206 may be more than one, as well.

The interaction of the server 106 with the client 102 and with different locations of the distribution of the server 106 may traverse vast distances employing all of the elements of the communication path 104. The interaction may also utilize only a portion of the communication path 104. For illustrative purposes, the server 106 is shown connecting to the network, although it is understood that the server 106 may connect to other devices, such as another of the server 106 in the same location or storage, as well.

Figure 3:
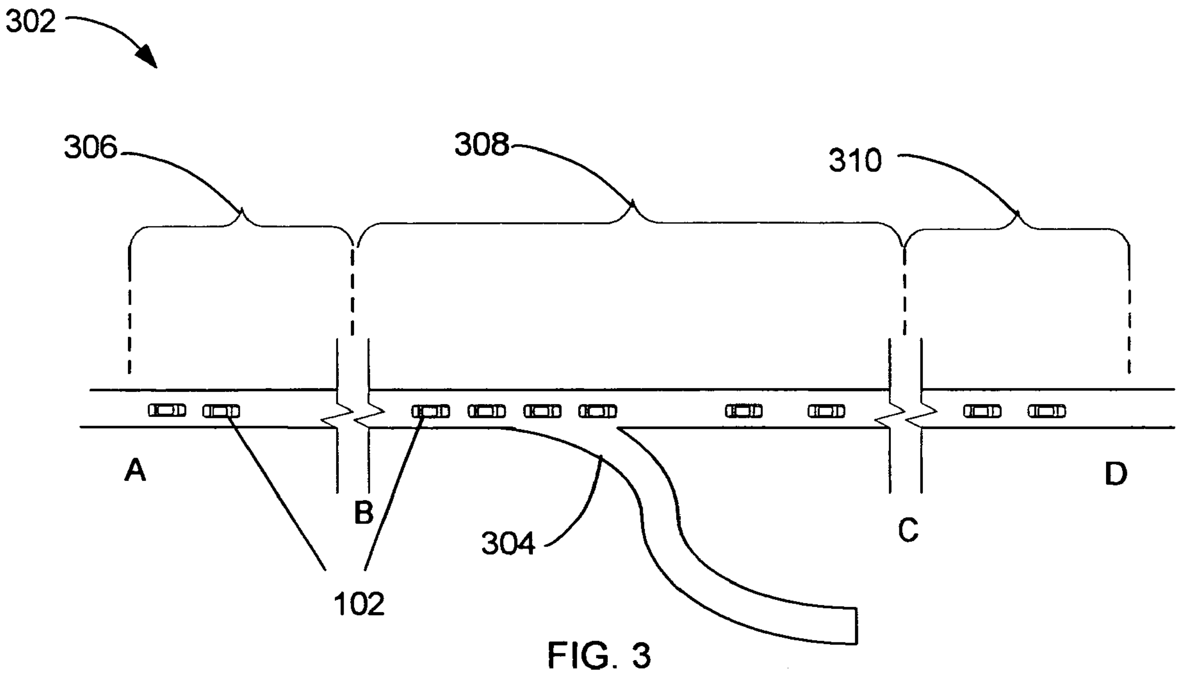
FIG. 3 is an aerial representation of a roadway segment with a distribution of the client having location based service capability.

Referring now to FIG. 3, therein is shown an aerial representation of a roadway segment 302 with a distribution of the client 102 having location based service capability. The aerial representation depicts an example of a distribution of the client 102 in a traffic flow on the roadway segment 302. The roadway segment 302, having an exit 304, is depicted as different regions, a first region 306, a second region 308, and a third region 310.

For example, the first region 306 depicts an average traffic speed sampled from the distribution of the client 102 at the beginning of the first region 306 as 70 mph (miles per hour) and at the end of the first region 306 as 30 mph. The second region 308, having the exit 304, is a region with no server access and the distribution of the client 102 cannot provide sampled navigation information to the server 106 in the second region 308. The client 102 may continue to sample the navigation information, or may store the samples, and interact with the server 106 sending the stored samples, such as when the client 102 reaches an area with server access beyond the second region 308. The third region 310 depicts an average traffic speed sampled from the distribution of the client 102 at the beginning of the third region 310 as 50 mph (miles per hour) and at the end of the third region 310 as 70 mph.

The intelligent real-time distributed traffic sampling and navigation system 100 may extrapolate possible traffic conditions in the second region 308 with no server access utilizing navigation information sampled from the first region 306 and the second region 308. The navigation information sampled in the second region 308 and sent to the sever 106 in the third region 310 may be used for improving the accuracy of the extrapolation analysis in the server 106. The client 102 with location based services capability may not populate the entire traffic volume on the roadway segment. Consequently, the total traffic volume on the roadway segment 302 may not be part of the sampled distribution of the client 102 providing the sampled navigation information. The server 106 may control or modify the rules and logic, such as the sampling rate or the number of samples, before the roadway segment 302, in the roadway segment 302, and after the roadway segment 302, as desired. The client 102 may have sampling rules and logics included as well as the server 106 updating the rules or logics or both in the client 102.

The traffic flow before the roadway segment 302 may be substantially constant and the server 106 may optimize accordingly the interaction between the server 106 and the distribution of the client 102. For example, the server 106 may send controls to the distribution of the client 102 to reduce the sample rate of the navigation information transmitted to the server 106, or the server 106 may send controls to the distribution of the client 102 to reduce the sample size from the distribution of the client 102. Both changes reduce the bandwidth needed for the communication path 104 and the server 106 as well as reduce the workload for the server 106. The rules and logic for interaction may be included in the client 102 and updated by the server 106, or updated by the client 102. The client 102 and server 106 thus may adaptively update the rules and the logics as appropriate.

As the traffic flow slows in the first region 306, the server 106, the client 102, or the combination thereof may change the sample rate, or the number of samples transmitted by the distribution of the client 102. The server 106 may determine from the sampled navigation information that the temporal delay across the second region 308 may require additional samples. The server 106 may increase the sample rate and the number of samples from the distribution of the client 102 to extrapolate, such as perform statistical spatial correlation, a traffic flow in the second region 308 with no service, as desired. The server 106 may extrapolate the traffic flow in the second region 308 with the traffic volume exiting the first region 306 and entering the third region 310. The server 106 may modify the travel route, such as taking the exit 304, and estimated travel time, such as increasing travel times on the roadway segment 302, resulting from the extrapolated traffic flow in the second region 308. The server 106 may send the updates, such as control information, revised travel routes, or revised estimated travel times, to the distribution of the client 102. The client 102 may store the sampled navigation information while interaction with the server 106 is not possible and then transmit the stored navigation information when server access is possible and appropriate.

The server 106 may analyze navigation information samples collected and received from the client 102, or a distribution of clients 102, and update travel times as well as modify the travel routes information sent to the distribution of the client 102, as desired. Other traffic sample feeds, if available, may be used to corroborate travel time estimates and modifying travel routes. The navigation information samples may be provided to other traffic feeds, especially for roadways with no stationary traffic monitoring system, and to other forms of traffic monitoring system.

For illustrative purposes, the navigation information samples collected and received from the client 102,or a distribution of clients 102, may be analyzed by the server 106 using, such as extrapolation and best fit approach, although it is understood that other analysis forms and algorithms may be used, as well.

Figure 4:
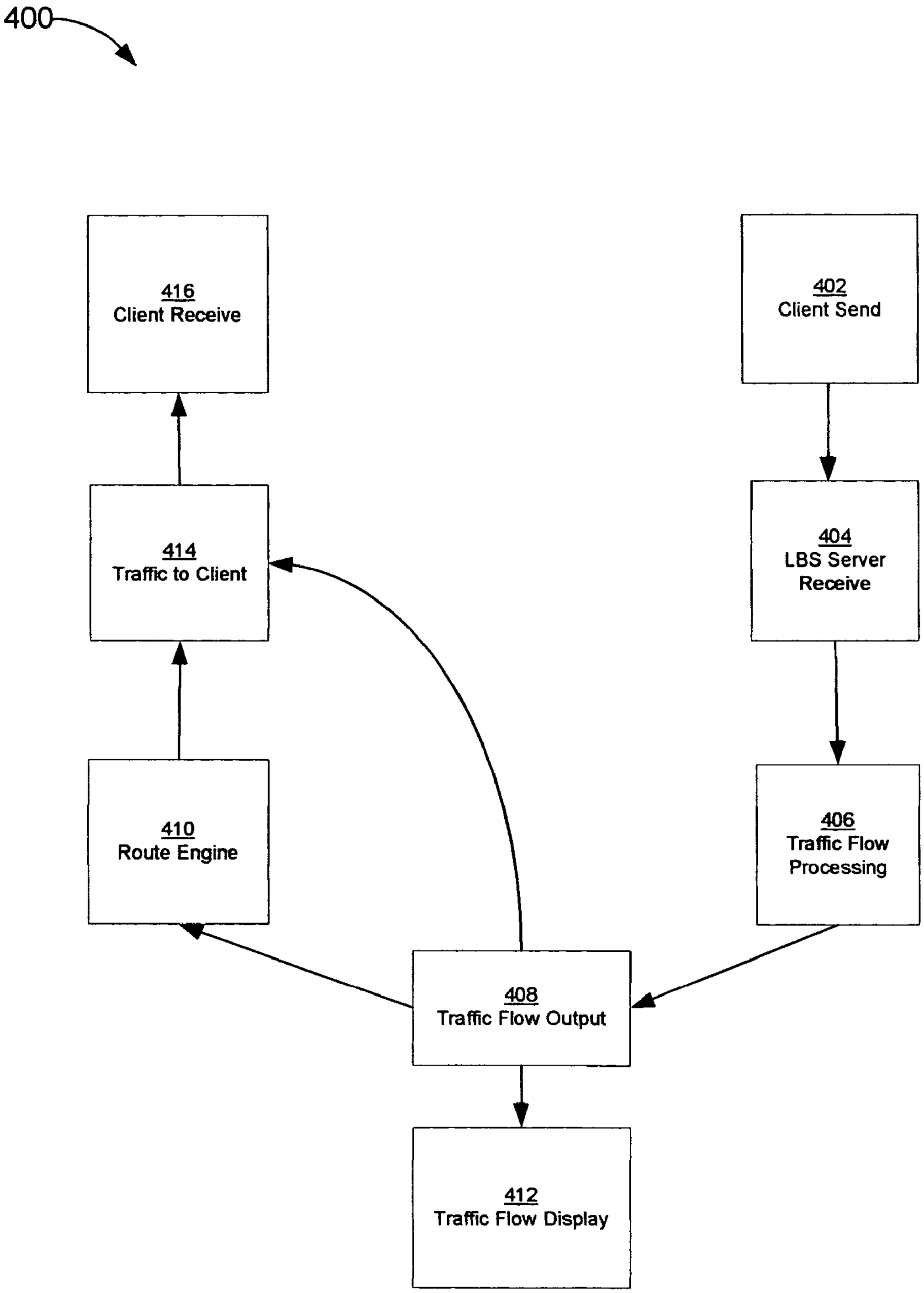
FIG. 4 is a flow chart of an example of a processing flow in the server of the navigation information samples.

Referring now to FIG. 4, therein is shown a sample flow chart for a navigation information processing flow 400 in the server 106 with the navigation information samples collected by the client 102. The navigation information processing flow 400 depicts a client send 402 where the distribution of the client 102 of FIG. 1 sends navigation information over the communication path 104 of FIG. 1. The server 106 of FIG. 2 receives the navigation information from the distribution of the client 102 represented as a LBS server receive 404. The server 106 analyzes the navigation information samples in a traffic flow processing 406. The traffic flow processing 406 also computes a traffic flow function across a service area utilizing the navigation information samples from the client 102, traffic density, mapped road length, speed, weather, and other traffic sources.

The server 106 may execute the traffic flow processing 406 utilizing all of the navigation information samples or a subset of the navigation information samples. The traffic flow processing 406 may use current, past data of the navigation information samples, and other traffic feeds improving the accuracy and reliability of the generated results. The traffic flow processing 406 may use a distribution of the server 106 and distributed processing as well as distributed storage. The traffic flow processing 406 may utilize the navigation information samples stored in different locations. The traffic flow processing 406 may use a number of different algorithmic approaches, such as recursive, in line, statistical spatial correlation, or corrective, generating and validating the results of the traffic flow processing 406.

The server 106 provides the results of the traffic flow processing 406 to a traffic flow output 408 to be used with other components of the location based service functions performed by the server 106. The traffic flow output 408 provides information to a route engine 410 responsible for generating and modifying travel routes as well as travel time. The traffic flow output 408 may also provide results to a traffic flow display 412 that may be used by a web display of the location based service, or to other services, such as emergency 911 (E911). The route engine 410 may provide traffic and travel updates to the client 102 by a traffic to client 414. The traffic flow output 408 may provide the results of the traffic flow processing 406 to the traffic to client 414, as well. The traffic to client 414 sends the updates to the client 102 with a client receive 416.

The intelligent real-time distributed traffic sampling and navigation system 100 may be executed with circuitry, software, or combination thereof The navigation information processing flow 400 may be executed with circuitry, software, or combination thereof It has been discovered that the intelligent real-time distributed traffic sampling and navigation system 100 provides flexible, geographically expansive, efficient, and robust real-time navigation information to location based services enabled devices that have not been previously achieved. The geographically distributed client devices provide traffic sampling capability not constrained by existing traffic monitoring infrastructures and systems. The server-client partition provides control for sampling, storing, transmitting, receiving, and processing the sampled navigation information. Controlling sampling rate, sampling time, sampling events, and the geographic region for sampling, and the number of samples allow the intelligent real-time distributed traffic sampling and navigation system 100 to generate and validate travel routes, estimated travel time, and update location based services available at the location of the client devices as well as optimize resource usage of the communication path 104, the server 106, and the client 102.

Figure 5:
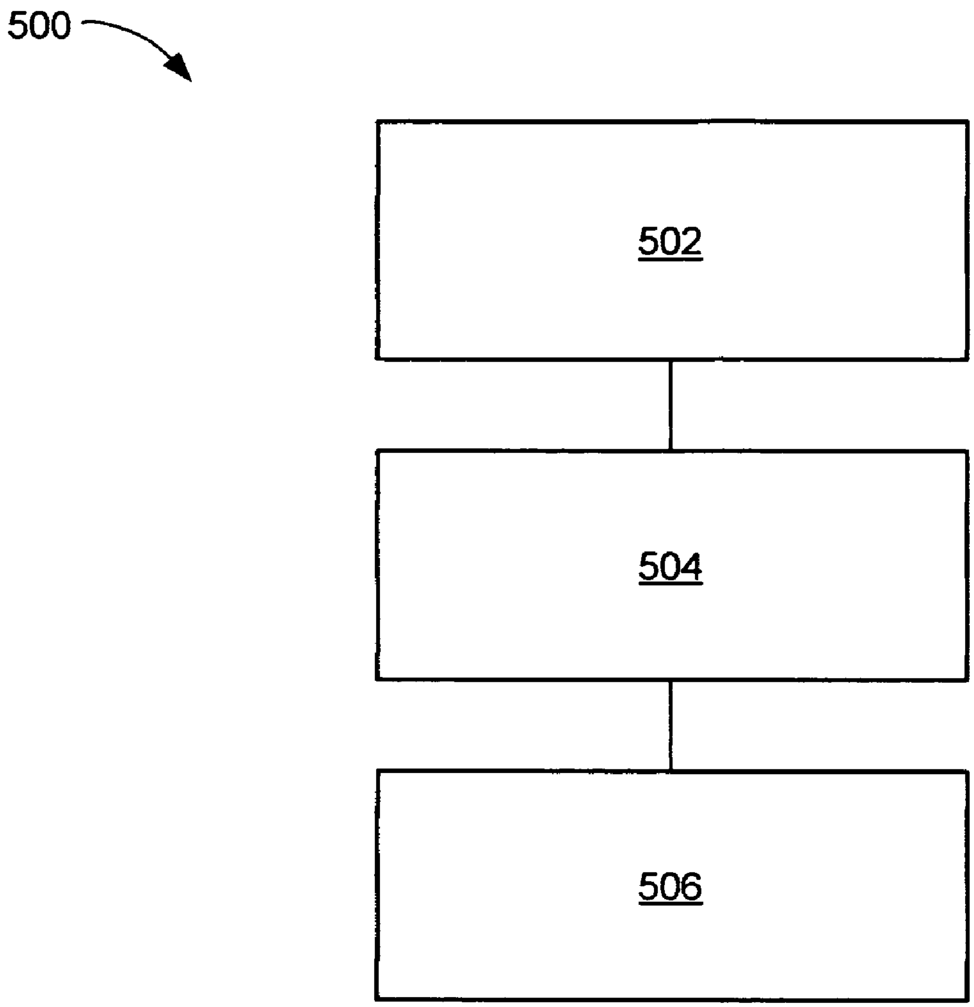
FIG. 5 is a flow chart of the intelligent real-time distributed traffic sampling and navigation system in an embodiment of the present invention.

Referring now to FIG. 5, therein is shown flow chart of the intelligent real-time distributed traffic sampling and navigation system 500 for manufacturing the intelligent real-time distributed traffic sampling and navigation in an embodiment of the present invention. The system 500 comprising a client having location based service capability and a server, wherein system 500 provides intelligent sampling of navigation information by the client in a block 502; transmitting the navigation information from the client to the server in a block 504; and generating an update information by the server with the navigation information in a block 506.

An aspect of the present invention is the cost reduction to obtain and provide traffic information, especially in geographic locations void of real-time traffic monitoring system. Another aspect of the present invention is to provide traffic information with optimal usage for the client, communication network and server resources, which also reduces operation costs. Another aspect of the present invention is that real-time traffic information may be used to improve the accuracy of the updates, such as travel routes, estimated travel time, or location based services, sent to the client devices. Yet another aspect of the present invention may provide information, such as the raw navigation information samples or generated/extrapolated traffic information, to other feeds, such as other traffic feeds or services, such as Federal or local governmental agencies.

While the invention has been described in conjunction with a specific best mode, it is to be understood that many alternatives, modifications, and variations will be apparent to those skilled in the art in light of the description. Accordingly, it is intended to embrace all such alternatives, modifications, and variations that fall within the scope of the included claims. All matters set forth herein or shown in the accompanying drawings are to be interpreted in an illustrative and non-limiting sense.

We claim:

1. A method for operating an intelligent real-time distributed traffic sampling and navigation system comprising:

selecting a geographic region;

receiving a client's navigation information from the geographic region including receiving the client's navigation information sampled in a no server access region after a client's position has reached an area with server access;

analyzing the client's navigation information to provide traffic information;

generating a travel route based on the analyzing the navigation information; and sending the travel route for displaying on a client; and wherein receiving the client's navigation information includes:

receiving the client's navigation information from a portion of a client distribution.

2. The method as claimed in claim 1 further comprising:

generating a travel time based on the analyzing the navigation information; and sending the travel time to the client's position.

3. The method as claimed in claim 1 wherein analyzing the client's navigation information sampled in the no server access region includes extrapolating a traffic condition in the no server access region utilizing the client's navigation information sampled in a region having server access.

4. The method as claimed in claim 1 wherein analyzing the client's navigation information includes corroborating the client's navigation information with a traffic feed.

5. A method for operating an intelligent real-time distributed traffic sampling and navigation system comprising:

providing controls for selecting a geographic region at a client with the controls at the client;

receiving client's navigation information in the geographic region including receiving the client's navigation information sampled in a no server access region after a client's position has reached an area with server access;

analyzing the client's navigation information to provide traffic information;

generating a travel route based on the analyzing the client's navigation information; and sending the update for displaying on the client; and wherein receiving the client's navigation information includes:

receiving the client's navigation information from a portion of a client distribution.

6. The method as claimed in claim 5 wherein analyzing the client's navigation information includes processing traffic flow and displaying results of the traffic flow processing.

7. The method as claimed in claim 6 wherein analyzing the client's navigation information includes extrapolating a traffic condition with navigation information from the no server access region to improve extrapolation analysis.

8. The method as claimed in claim 5 wherein receiving the client's navigation information includes receiving the client's navigation information sampled in the no server access region with navigation information sampled in an area with server access.

9. The method as claimed in claim 5 wherein analyzing the client's navigation information includes analyzing the client's navigation information using a best fit approach.

10. An intelligent real-time distributed traffic sampling and navigation system comprising:

a control module for selecting a geographic region;

a server receive module for receiving client's navigation information from the geographic region including receiving the client's navigation information sampled in a no server access region after a client's position has reached an area with server access;

a traffic flow processing module, coupled to the server receive module, for analyzing the client's navigation information;

a traffic flow display module, coupled to the traffic flow processing module, for displaying the output of the analyzing the client's navigation information;

a route engine module, coupled to the traffic flow processing module, for generating a travel route based on the analyzing the client's navigation information; and a traffic to client module, coupled to the route engine module, for sending the travel route to the client; and wherein receiving the client's navigation information includes:

receiving the client's navigation information from a portion of a client distribution.

11. The system as claimed in claim 10 further comprising:

the route engine module for generating a travel time based on the analyzing the client's navigation information; and the traffic to client module for sending the travel time to the client.

12. The system as claimed in claim 10 wherein the traffic flow processing module is for extrapolating a traffic condition in the no server access region utilizing the client's navigation information sampled in a region having server access.

13. The system as claimed in claim 10 wherein the traffic flow processing module is for corroborating the client's navigation information with a traffic feed.

14. The system as claimed in claim 10 further comprising a server client partition module for providing controls to the client.

15. The system as claimed in claim 14 wherein the traffic flow processing module is for processing traffic flow and displaying results of the traffic flow processing.

16. The system as claimed in claim 14 wherein the traffic flow processing module is for extrapolating a traffic condition with the client's navigation information from the no server access region to improve extrapolation analysis.

17. The system as claimed in claim 14 wherein a server receive module is for receiving the client's navigation information sampled in the no server access region with the client's navigation information sampled in an area with server access.

18. The system as claimed in claim 14 wherein a traffic flow processing module is for analyzing the client's navigation information using a best fit approach.

* * * * *